US012737244B2

(12) United States Patent
Kazi et al.

(10) Patent No.: US 12,737,244 B2
(45) Date of Patent: Sep. 15, 2026

(54) PROACTIVE OPERATING SYSTEM MEMORY UNIT REPLACEMENT BASED ON NAMESPACE HEALTH

(71) Applicant: International Business Machines Corporation, Armonk, NY (US)

(72) Inventors: Asimuddin Kazi, Naperville, IL (US); Alejandro Reyther, Fox River Grove, IL (US); Edward James Weisbrod, Arlington Heights, IL (US); Adam Gray, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/938,516

(22) Filed: Nov. 6, 2024

(65) Prior Publication Data

US 2026/0127057 A1 May 7, 2026

(51) Int. Cl.
*G06F 11/00* (2006.01)
*G06F 3/06* (2006.01)

(52) U.S. Cl.
CPC .......... *G06F 11/004* (2013.01); *G06F 3/0616* (2013.01); *G06F 3/0653* (2013.01); *G06F 3/067* (2013.01); *G06F 2201/81* (2013.01)

(58) Field of Classification Search
CPC .... G06F 11/004; G06F 3/0616; G06F 3/0653; G06F 3/067; G06F 2201/81
See application file for complete search history.

(56) References Cited

U.S. PATENT DOCUMENTS

| | | | |
|---|---|---|---|
| 5,761,411 | A | 6/1998 | Teague et al. |
| 7,584,219 | B2 | 9/2009 | Zybura et al. |
| 7,987,167 | B1 | 7/2011 | Kazar et al. |
| 8,108,483 | B2 | 1/2012 | Aust et al. |
| 8,151,352 | B1 | 4/2012 | Novitchi |
| 8,447,780 | B1 | 5/2013 | Plantenberg et al. |
| 9,142,322 | B2 | 9/2015 | Baranwal et al. |
| 9,171,160 | B2 | 10/2015 | Vincent et al. |
| 9,535,774 | B2 | 1/2017 | Cher et al. |

(Continued)

OTHER PUBLICATIONS

"Intel® Optane™ DC SSD Series", Intel, Feb. 2012, 27 pages, https://ark.intel.com/content/www/us/en/ark/products/series/213706/intel-optane-dc-ssd-series.html.

(Continued)

*Primary Examiner* — Charles Rones
(74) *Attorney, Agent, or Firm* — CANTOR COLBURN LLP; Stephen Yoder

(57) ABSTRACT

A computer-implemented method includes receiving diagnostic data about a plurality of operating system (OS) memory units of a distributed computing system. The method further includes defining a failure state for predicting whether at least one of the plurality of OS memory units will experience a failure. The method further includes predicting whether the at least one of the plurality of OS memory units will experience the failure based at least in part on the failure state and the diagnostic data about the plurality of OS memory units. The method further includes causing the at least one of the plurality of OS memory units predicted to experience the failure to be replaced with at least one replacement OS memory unit without impacting a namespace availability of the distributed computing system.

20 Claims, 4 Drawing Sheets

(56) References Cited

U.S. PATENT DOCUMENTS

| | | | | |
|---|---|---|---|---|
| 9,686,293 | B2 | 6/2017 | Golshan et al. | |
| 10,275,361 | B2 | 4/2019 | Ish et al. | |
| 10,884,648 | B2 | 1/2021 | Guo et al. | |
| 10,891,068 | B2 | 1/2021 | Guo et al. | |
| 11,226,860 | B1 | 1/2022 | Baptist et al. | |
| 11,314,442 | B2 | 4/2022 | Kazi et al. | |
| 11,412,041 | B2 | 8/2022 | Tamborski et al. | |
| 11,588,892 | B1 | 2/2023 | Khadiwala et al. | |
| 11,973,823 | B1 | 4/2024 | Ghorpade et al. | |
| 2007/0006048 | A1 | 1/2007 | Zimmer et al. | |
| 2011/0145838 | A1* | 6/2011 | de Melo | G06F 11/323 719/318 |
| 2013/0326284 | A1 | 12/2013 | Losh et al. | |
| 2014/0032962 | A1* | 1/2014 | Deshpande | G06F 11/0706 714/15 |
| 2015/0074469 | A1 | 3/2015 | Cher et al. | |
| 2015/0127919 | A1* | 5/2015 | Baldwin | G06F 3/0652 711/166 |
| 2015/0243373 | A1* | 8/2015 | Chun | G06F 11/2053 714/710 |
| 2016/0019983 | A1* | 1/2016 | Chung | G11C 29/78 365/96 |
| 2016/0072889 | A1 | 3/2016 | Jung et al. | |
| 2017/0004309 | A1 | 1/2017 | Pavlyushchik et al. | |
| 2017/0031959 | A1 | 2/2017 | Zayas et al. | |
| 2017/0090824 | A1 | 3/2017 | Tamborski | |
| 2017/0093978 | A1 | 3/2017 | Cilfone et al. | |
| 2018/0025025 | A1 | 1/2018 | Davis et al. | |
| 2018/0239697 | A1 | 8/2018 | Huang et al. | |
| 2018/0314441 | A1 | 11/2018 | Suryanarayana et al. | |
| 2019/0065524 | A1 | 2/2019 | Johnson et al. | |
| 2019/0146675 | A1 | 5/2019 | Subramanian et al. | |
| 2019/0146907 | A1 | 5/2019 | Frolikov | |
| 2019/0188589 | A1* | 6/2019 | Ponnuru | G11C 29/52 |
| 2019/0278498 | A1 | 9/2019 | Dedrick | |
| 2019/0281114 | A1 | 9/2019 | Cocagne | |
| 2019/0394272 | A1 | 12/2019 | Tamborski et al. | |
| 2020/0019447 | A1 | 1/2020 | Tamborski et al. | |
| 2020/0050365 | A1 | 2/2020 | Tamborski et al. | |
| 2020/0104056 | A1 | 4/2020 | Benisty et al. | |
| 2020/0192799 | A1 | 6/2020 | Johns et al. | |
| 2020/0278896 | A1* | 9/2020 | Kumari | G06F 11/1048 |
| 2020/0409559 | A1 | 12/2020 | Sharon et al. | |
| 2021/0173582 | A1 | 6/2021 | Kazi et al. | |
| 2021/0216227 | A1 | 7/2021 | Kazi et al. | |
| 2021/0349782 | A1 | 11/2021 | Ki et al. | |
| 2021/0367834 | A1 | 11/2021 | Palavalli et al. | |
| 2022/0236916 | A1 | 7/2022 | Esaka et al. | |
| 2023/0195577 | A1 | 6/2023 | Darnell et al. | |
| 2023/0401120 | A1* | 12/2023 | Gim | G06F 11/073 |
| 2024/0220227 | A1 | 7/2024 | Kerr et al. | |
| 2024/0361939 | A1 | 10/2024 | Brown et al. | |
| 2024/0377948 | A1 | 11/2024 | Zhang et al. | |
| 2025/0077475 | A1 | 3/2025 | Qi et al. | |

OTHER PUBLICATIONS

"Intel® Solid-State Drive 520 Series", Intel, Sep. 9, 2024, 5 pages, https://www.intel.com/content/dam/www/public/us/en/documents/product-specifications/ssd-520-specification.pdf.

"SMART Attribute Details", Kingston, 2015, 9 pages, https://media.kingston.com/support/downloads/MKP_306_SMART_attribute.pdf.

"SSD Failures: Common Causes and Main Bad Symptoms", Multi-cloud backup Solutions, Oct. 27, 2020, 9 pages, https://www.salvagedata.com/ssd-failures-common-causes-and-main-symptom/.

"Tabular Classification", Hugging Face, retrieved from web dated Dec. 20, 2024, 4 pages.

"What is supervised learning?", IBM, retrieved from web dated Dec. 20, 2024, 9 pages.

Diamantopoulos et al. "WannaLaugh: A Configurable Ransomware Emulator—Learning to Mimic Malicious Storage Traces", arXiv:2403.07540v2 [cs.CR], Jun. 12, 2024, 22 pages, https://arxiv.org/abs/2403.07540v1#.

Gagulic et al. "Ransomware Detection with Machine Learning in Storage Systems", University of Zurich Department of Informatics (IFI) Binzmühlestrasse 14, CH-8050 Zürich, Switzerland, Feb. 13, 2023, 114 pages, https://files.ifi.uzh.ch/CSG/staff/vonderassen/extern/theses/map-gagulic-zumtaugwald-sahu.pdf.

Kruegel Christopher. "Full System Emulation: Achieving Successful Automated Dynamic Analysis of Evasive Malware", Lastline, 2014, 7 pages.

Lucia Theo. "An Ultimate Guide to Hard Drive Problems, Solutions and Tips", The Wayback Machine, Jan. 13, 2021, 21 pages, https://web.archive.org/web/20210122072236/https://recoverit.wondershare.com/computer-problem/common-hard-drive-problems-and-solution.html.

Rout Sidhartha Sankar. "Reliability Aware Intelligent Memory Management (RAIMM)", Indraprastha Institute of Information Technology Delhi, New Delhi, 2014, 54 pages, https://repository.iiitd.edu.in/jspui/handle/123456789/146.

Sharma Natasha. "K-Means Clustering Explained", Neptune Blog, Apr. 15, 2024, 25 pages.

Sharma Pulkit. "An Introduction to K-Means Clustering", Machine Learning, Dec. 18, 2024, 43 pages.

Taylor et al. "Sensor-based Ransomware Detection", Future Technologies Conference (FTC), Nov. 29-30, 2017, 8 pages, https://s2.smu.edu/~mitch/ftp_dir/pubs/ftc17.pdf.

Wijaya Cornellius Yudha. "LLMs Implementation for Tabular Classifications", Trying out ML Tabular Classification Task with LLM, Nov. 16, 2023, 9 pages.

Zhang et al. "Towards Foundation Models for Learning on Tabular Data", arXiv:2310.07338 [cs.LG], Oct. 11, 2023, 22 pages.

Authors et al.: Disclosed Without Attribution, IP.com No. IPCOM000252417D, "Method and System for Classifying Memory Devices and Slices to Create Optimal Storage Decisions in Distributed Storage Network (DSN)", Jan. 9, 2018, 3 pages.

Authors et al.: Disclosed Without Attribution, IP.com No. IPCOM000263306D, "Dispersed Storage Namespace Health Based Device Prioritization and Recovery Algorithm", Aug. 17, 2020, 7 pages.

Authors et al.: Disclosed Without Attribution, IP.com No. IPCOM000263385D, "Methodology of Hinting the NVME Host about the NVME Queues Optimized for NVME Namespace Operation", Aug. 26, 2020, 7 pages.

Authors et al.: Seagate Technology, LLC, IP.com No. IPCOM000268073D, "Staged NVMe in a Primary/Secondary Relationship", Dec. 21, 2021, 4 pages.

Han et al. "ZNS+: Advanced Zoned Namespace Interface for Supporting In-Storage Zone Compaction", Proceedings of the 15th USENIX Symposium on Operating Systems Design and Implementation, Jul. 14-16, 2021, 17 pages.

Kazi, et al. "Namespace Range-Based Memory Device Compaction," U.S. Appl. No. 19/078,385, filed Mar. 13, 2025, 29 pages.

Kazi, et al. "Upgrade Orchestration of a Storage System Based on Namespace Range Gaps," U.S. Appl. No. 18/938,502, filed Nov. 6, 2024, 40 pages.

Min et al. "eZNS: Elastic Zoned Namespace for Enhanced Performance Isolation and Device Utilization", ACM Transactions on Storage, Jun. 6, 2024, pp. 1-41, vol. 20, Issue 3.

Tamborski, et al. "Identifying and Visualizing Namespace Range Gaps," U.S. Appl. No. 18/938,511, filed Nov. 6, 2024, 41 pages.

Tamborski, et al. "Processing Namespace Range Information by a Global Coordinator," U.S. Appl. No. 18/938,523, filed Nov. 6, 2024, 27 pages.

Wang David. "Application Optimization with Flexible Zone Namespace Configurations in QLC-Based SSDs", Silicon Motion, 2023, 16 pages.

United States Notice of Allowance dated Apr. 27, 2026, 48 pages, in U.S. Appl. No. 19/078,385.

United States Non-Final Rejection dated Feb. 9, 2026, 45 pages, in U.S. Appl. No. 18/938,502.

United States Notice of Allowance dated Mar. 10, 2026, 17 pages, in U.S. Appl. No. 18/938,511.

(56) References Cited

OTHER PUBLICATIONS

United States Non-Final Rejection dated Dec. 17, 2025, 33 pages, in U.S. Appl. No. 18/938,511.
Rahi Rohit, "Object Storage", Oct. 2019, 18 pages, https://www.oracle.com/a/ocom/docs/cloud/object-storage-100.pdf.
SNIA, "The SNIA Dictionary", Mar. 2022, 02 pages, https://www.snia.org/sites/default/files/dictionary/SNIADictionary.pdf.
United States Non-Final Rejection dated Oct. 27, 2025, 15 pages, in U.S. Appl. No. 18/938,523.

* cited by examiner

| ID# | Attribute_Name | Flag | Value | Worst | Threshold | Type | Updated | When_Failed Raw_Value |
|---|---|---|---|---|---|---|---|---|
| 5 | Reallocated_Sector_Ct | 0x0032 | 200 | 100 | 000 | Old_age | Always | 0 |
| 9 | Power_On_Hours | 0x0032 | 100 | 100 | 000 | Old_age | Always | 31310 |
| 232 | Available_Reserved_Space | 0x0033 | 100 | 100 | 010 | Pre-fail | Always | 0 |
| 243 | NAND_Writes_32MiB | 0x0032 | 100 | 100 | 000 | Old_age | Always | 5619014 |

PROACTIVE OPERATING SYSTEM MEMORY UNIT REPLACEMENT BASED ON NAMESPACE HEALTH

BACKGROUND

The present disclosure relates to computing environments, and more specifically, to proactive operating system (OS) memory unit replacement based on namespace health.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computing device may effectively extend its CPU by using "cloud computing" to perform one or more computing functions (e.g., a service, an application, an algorithm, an arithmetic logic function, etc.) on behalf of the computing device.

Further, for large services, applications, and/or functions, cloud computing may be performed by multiple cloud computing resources in a distributed manner to improve the response time for completion of the service, application, and/or function. For example, Hadoop is an open-source software framework that supports distributed applications, enabling application execution by hundreds or thousands of computers.

In addition to cloud computing, a computing device may use "cloud storage" as part of its memory system. Cloud storage enables a user, via its computing device, to store files, applications, etc., on an Internet-based storage system. The Internet-based storage system may include a RAID (redundant array of independent disks) system and/or a dispersed storage system that uses an error correction scheme to encode data for storage.

SUMMARY

According to an embodiment, a computer-implemented method for identifying and visualizing namespace range gaps is provided. The method includes receiving diagnostic data about a plurality of operating system (OS) memory units of a distributed computing system. The method further includes defining a failure state for predicting whether at least one of the plurality of OS memory units will experience a failure. The method further includes predicting whether the at least one of the plurality of OS memory units will experience the failure based at least in part on the failure state and the diagnostic data about the plurality of OS memory units. The method further includes causing the at least one of the plurality of OS memory units predicted to experience the failure to be replaced with at least one replacement OS memory unit without impacting a namespace availability of the distributed computing system.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

DETAILED DESCRIPTION

Figure 1:
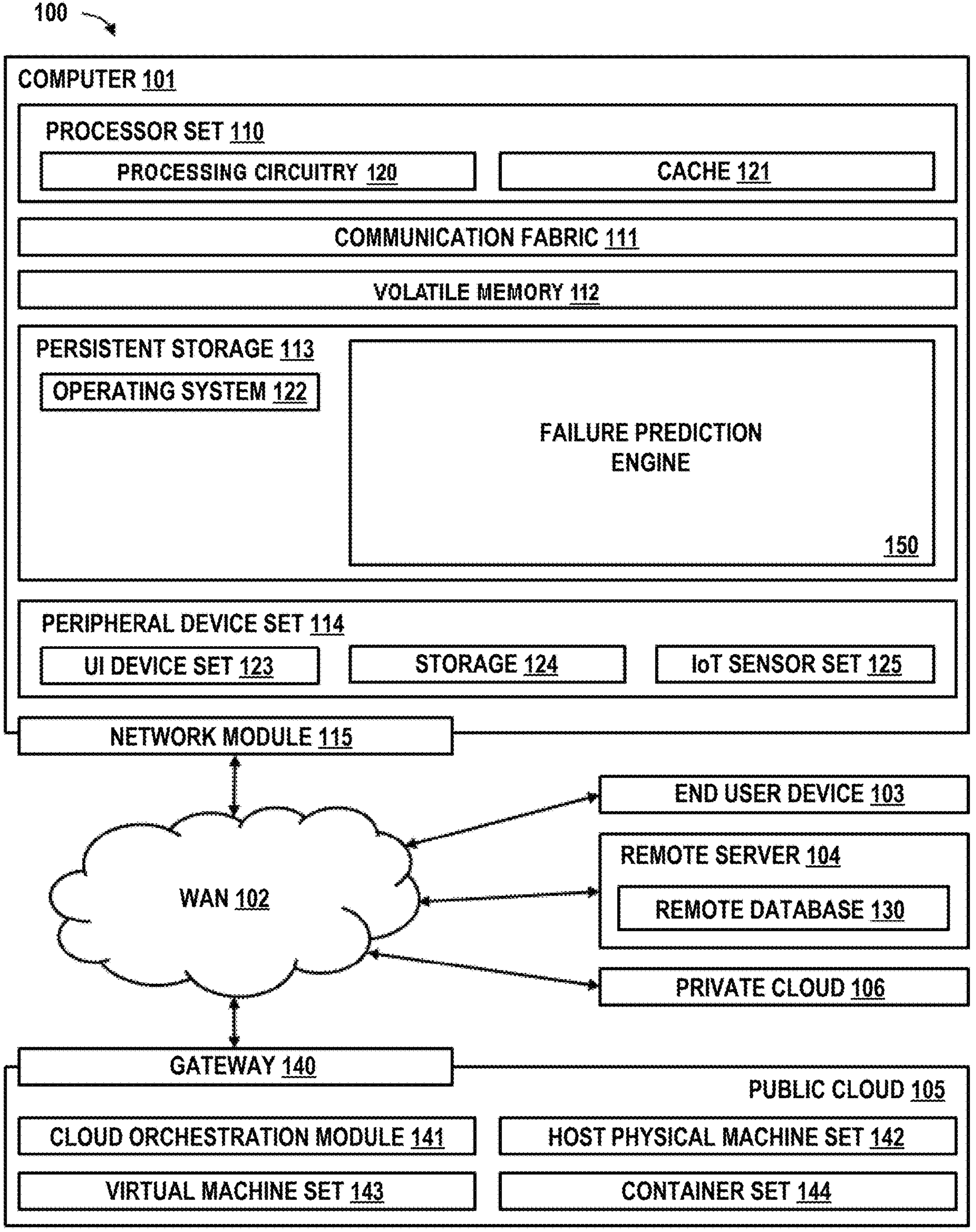
FIG. 1 illustrates a block diagram of a computing environment, according to an embodiment.

One or more embodiments described herein provide for proactive operating system (OS) memory unit replacement based on namespace health.

Storage systems refer to the various methods and technologies used to save, manage, and retrieve data. They encompass a range of solutions, from traditional hard disk drives (HDDs) and solid-state drives (SSDs) to advanced cloud-based and network-attached storage (NAS) systems. These systems are useful for both individuals and organizations to securely store and access data efficiently. Storage systems can be classified into primary storage, which includes high-speed devices for quick access, and secondary storage, which provides larger capacity and longer-term data retention. Advanced storage solutions also utilize technologies like RAID configurations, distributed storage, and object storage, which enhance data redundancy, reliability, and scalability. Modern systems often integrate with cloud infrastructure, providing versatile options for backup, disaster recovery, and data synchronization across multiple locations.

Storage systems, and other distributed computing systems, can use OS memory units for handling and organizing system memory, such as random access memory (RAM) and virtual memory. Particularly, an OS memory unit refers to a portion of memory management within an operating system for handling and organizing the system memory, playing a role in ensuring efficient and safe usage of memory by applications and processes. Functions of OS memory units include, but are not limited to, one or more of memory allocation and deallocation, virtual memory management, paging and segmentation, protection and security, memory swapping, and/or the like, including combinations and/or multiples thereof.

In a storage system, a namespace provides a structured way to organize and manage data by assigning a unique identifier to each data element or object. This allows for easy retrieval and categorization, similar to how file paths work in a filesystem. A namespace ensures that data within the system can be accessed without ambiguity, as each item has a distinct identifier. In distributed and cloud storage systems, namespaces are useful for managing data across multiple storage nodes and locations, enabling seamless scaling and access control. By abstracting data storage from physical devices, namespaces also facilitate features, such as data deduplication, versioning, and metadata management, making it easier to implement policies for data lifecycle, security, and compliance.

Gaps in namespaces can occur when data is assigned a name and the underlying storage mechanism responsible for the name is unreadable or unavailable.

Failing or failed OS memory units can trigger various types of health issues to nodes of the distributed computing system, such as a distributed storage system, and/or to the entire system itself. Gaps in namespaces can contribute to problems in a distributed storage system when OS memory units are failing or failed. This results into many issues, such as server outage, input/output (I/O) failures, and/or missing data that requires expensive operation of rebuilding. In many cases, distributed systems are installed at the same time. Hence, most or all of the OS memory units in the system typically age together. The failure of multiple OS memory units can result into partial or complete outage of the distributed computing system, which can hinder the availability of the system. The OS memory unit failures can trigger hours, days, or in some cases weeks long outages on devices and in some cases, such as where multiple OS memory units fail, can cause outage on the whole distributed computing system. Some symptoms of OS memory unit failure may include one or more of the following: system will not boot up, system is running slowly, system freezes or hangs and does not respond, OS memory unit becomes read-only, OS memory unit or disk is quarantined, and/or other errors are observed.

It is desirable to provide a preventive approach to predict failing OS memory units to avoid nodes or the system going into bade states because of bad OS memory unit(s). For example, many of the problems associated with failed or failing OS memory units can be minimized, if not completely avoided or eliminated, by proactive OS memory unit replacement prior to the failure or a failing state. It may be useful to consider namespace health, such as gaps in namespaces, when predicting failing OS memory units.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a failure prediction engine 150 for proactive OS memory unit replacement based on namespace health. In addition to the failure prediction engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the failure prediction engine 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the failure prediction engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the failure prediction engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
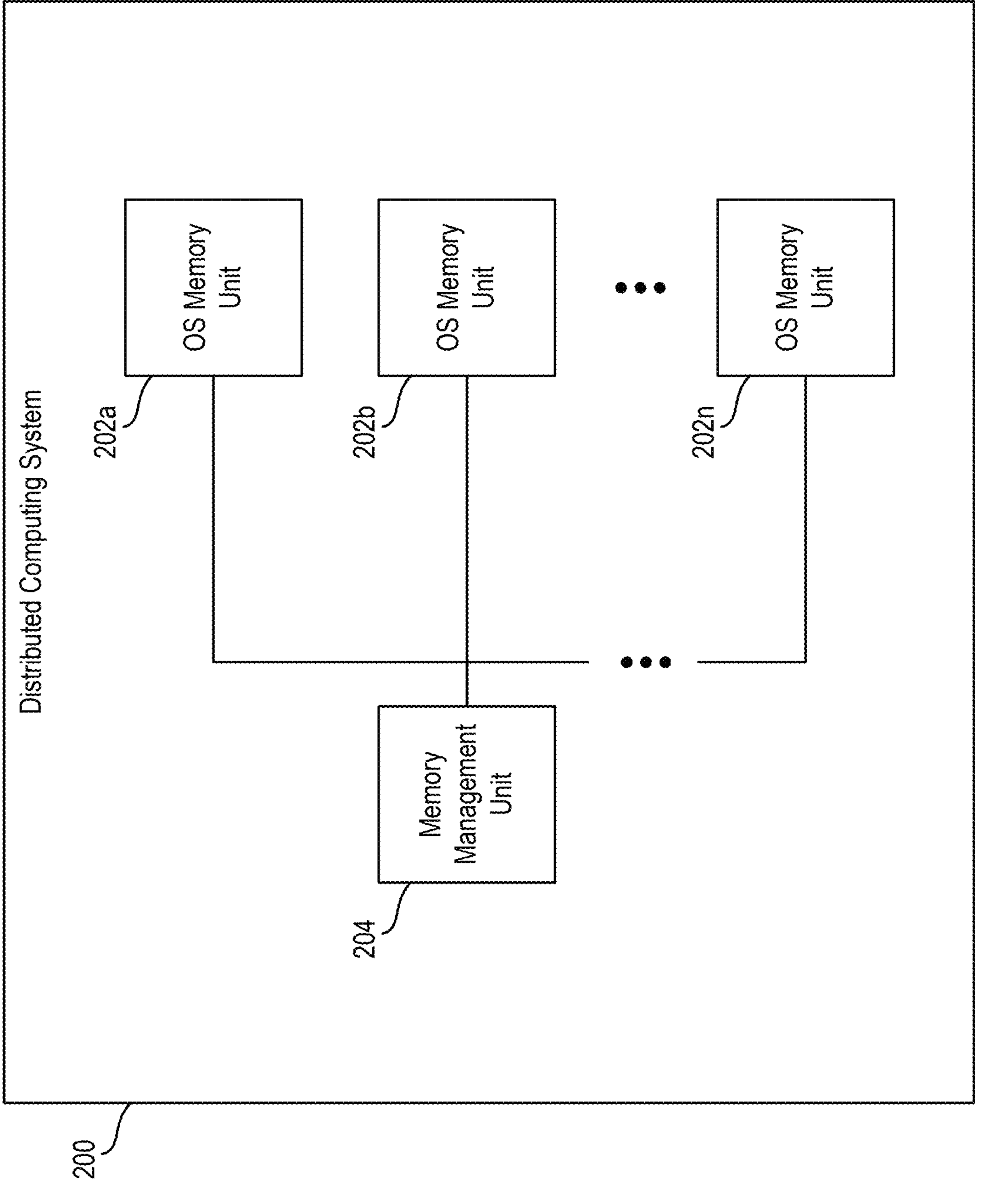
FIG. 2 schematically illustrates a block diagram of a distributed computing system having operating system memory units, according to an embodiment.

FIG. 2 illustrates a block diagram of a distributed computing system 200, according to an embodiment. The distributed computing system 200 is an example of a storage system, such as a data storage network (DSN). The distributed computing system 200 can be implemented by any suitable computing system, device, or environment, such as those described herein. The distributed computing system 200 includes multiple OS memory units 202*a*, 202*b*, . . . 202*n* (collectively, OS memory units 202). Although three OS memory units are shown, other numbers (e.g., fewer or greater) of OS memory units can be implemented in other embodiments. The OS memory units 202 are communicatively coupled to a memory management unit (MMU) 204, such as via a bus 206, for managing aspects of the OS memory units 202. It should be appreciated that the distributed computing system may include other components, such as processing resources (e.g., central processing units, graphics processing units, etc.), other memory devices, communication devices, input/output devices, and/or the like, including combinations and/or multiples thereof.

The OS memory units 202 store data and information related to executing an operating system on the distributed computing system 200. The MMU 204 manages aspects of the OS memory units 202, such as one or more of memory allocation and deallocation, virtual memory management, paging and segmentation, protection and security, memory swapping, and/or the like, including combinations and/or multiples thereof. According to one or more embodiments, the MMU 204 can implement the failure prediction engine 150 of FIG. 1.

One or more embodiments described herein provide for proactive replacement of one or more of the OS memory units 202.

Figure 3:
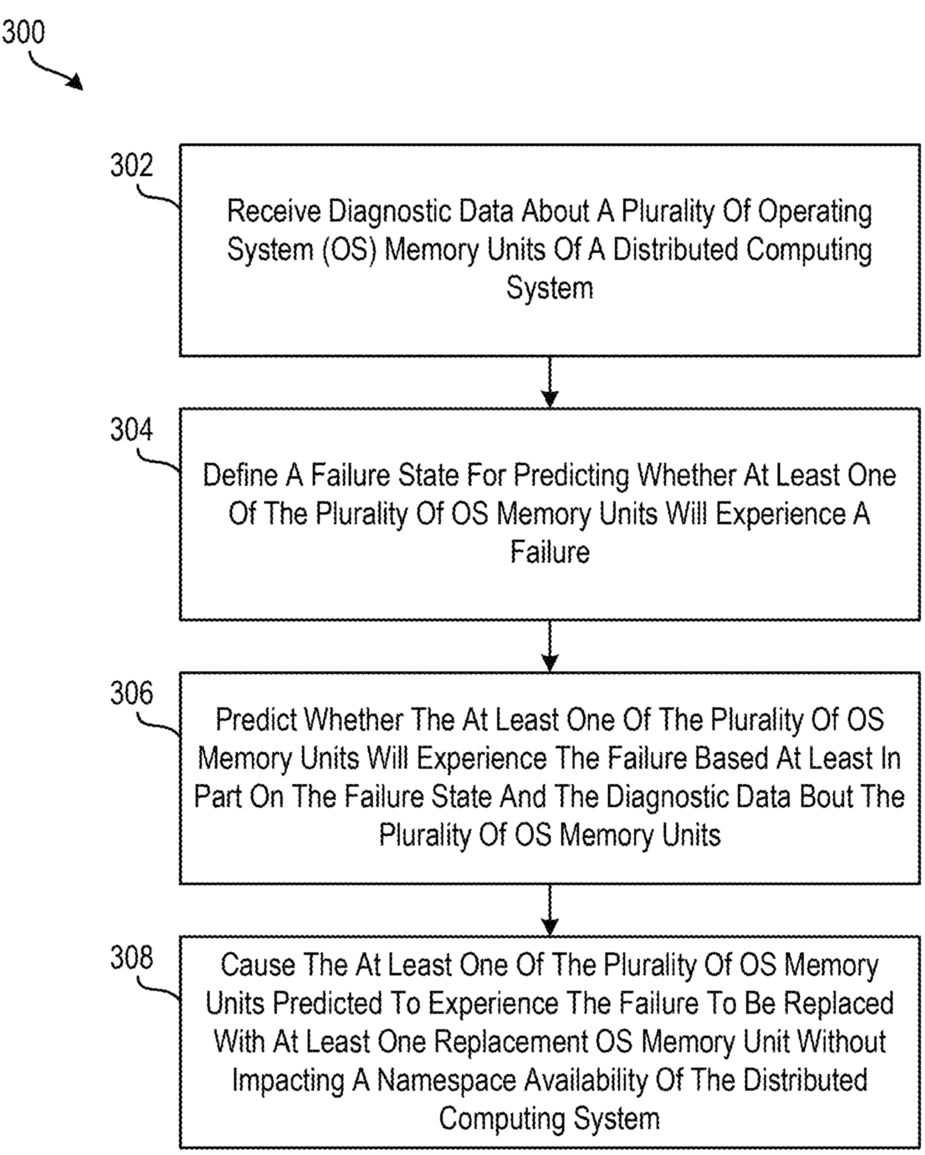
FIG. 3 illustrates a flow diagram of a method for proactive OS memory unit replacement based on namespace health, according to an embodiment.

Turning now to FIG. 3, a flow diagram of a method 300 for proactive OS memory unit replacement based on namespace health is provided, according to an embodiment. The method 300 can be performed by any suitable computing system, device, or environment, such as those described herein. The method 300 is now described with reference to the computing environment 100, and particularly the failure prediction engine 150, but is not so limited.

The method 300 begins at block 302, where the failure prediction engine 150 receives diagnostic data about a plurality of OS memory units (e.g., the OS memory units 202 of FIG. 2) of a distributed computing system (e.g., the distributed computing system 200 of FIG. 2). This step involves collecting various diagnostic metrics and health indicators from the OS memory units to monitor their status and performance. According to one or more embodiments, the diagnostic data is collected by the MMU 204 (e.g., the failure prediction engine 150). According to one or more embodiments, the diagnostic data includes self-monitoring, analysis, and reporting technology (SMART) data. The diagnostic data can be collected periodically, for example, such as every substantially 3 hours, although other periodic times can be used in other embodiments (e.g., every hour, every 2 hours, every 4 hours, every 6 hours, every 12 hours, every day, etc.). According to one or more embodiments, the diagnostic data can include memory unit error data from system logs. According to one or more embodiments, the diagnostic data is collected using an external agent or third-party application or tool.

At block 304, the failure prediction engine 150 defines a failure state for predicting whether at least one of the plurality of OS memory units will experience a failure. This step involves analyzing the collected diagnostic data to establish criteria or thresholds that indicate a potential failure condition for the OS memory units. At block 304, the SMART data is analyzed along with memory unit error data from system logs. What constitutes a failure or failing condition is defined.

As an example of a failure state, SMART data attributes are analyzed for deterioration (e.g., if smart value is close to failing threshold, e.g., 5% before it hits the vendor defined threshold). A Gaussian distribution, a normal distribution, or another suitable distribution can be used for each attribute based on historical data to define the failure state (e.g., threshold). The diagnostic data can be collected from any of the nodes in the distributed computing system (e.g., thousands of nodes in a cloud-based distributed computing system) and the failure state can be continued to be adjusted as new diagnostic data is collected.

As another example of a failure state, SMART attribute health failure information is considered. For example, if the diagnostic data indicates a SMART attribute health failure, the OS memory unit can be replaced.

As yet another example of a failure state, errors on the OS memory unit can be considered, such as if there are medium, high, or critical errors on the memory unit as indicated by the memory unit error data from system logs.

As yet another example of a failure state, age or power-on hours of the OS memory units can be considered, such as if the age or power-on hours indicates an OS memory unit is within a certain threshold of, or has already exceeded, a mean time to failure (MTTF) defined by a manufacturer of the OS memory unit.

As yet another example of a failure state, endurance ratings of the OS memory units can be considered, such as if the OS memory units get within a certain threshold of, or has already exceeded, a manufacturer's limit or deterioration of any other manufacturer specified attributes.

With continued reference to FIG. 3, at block 306, the failure prediction engine 150 predicts whether the at least one of the plurality of OS memory units will experience the failure based at least in part on the failure state and the diagnostic data about the plurality of OS memory units. This step involves using the defined failure state and the diagnostic data to forecast which OS memory units are likely to fail, allowing for proactive measures to be taken. This step provides a customizable prediction of OS memory unit failure using readily available metrics in enterprise data center applications. For example, using SMART data, each OS memory unit periodically submits diagnostic data to the failure prediction engine 150. Each metric is a key-value pair. The key of the key-value pair is a unique drive identifier (UUID) that can aid in identifying the OS memory unit so that it can be proactively replaced if likely to fail. The value of the key-value pair is a series of SMART attributes and/or additional custom attributes identified as suggestive of failure of OS memory units. Non-limiting examples of such attributes include, uncorrectable sector count, uncorrectable sector count date, reallocation event count, current pending sector count, reallocated sector count, reallocated event count, reported uncorrectable errors, spin retry count, command timeout, end to end error, read error rate, soft read error rate, and/or the like, including combinations and/or multiples thereof. The values of the key-value pairs can be stored in a value array. The value array can be ordered in such a manner where the most significant indicators of drive failure are listed first, while the least significant are listed last. This diagnostic data can then be processed via one or more methods to determine likelihood of disk failure.

An example of predicting OS memory unit failures is now described. Each OS memory unit participating in the predictive monitoring periodically submits diagnostic data (e.g., SMART) data to the failure prediction engine 150. The failure prediction engine 150 submits each key-value pair of metrics to function, the value is converted into an array of numbers: [int, long, int, int, int, int, int, int, int, int, int], which can then be quantized into a vector using k-means clustering. If the classification via k-means clustering places the value within the "unhealthy" cluster, the distance to the centroid of the "unhealthy" cluster is stored within the value of the key-value store. As the centroid distance approaches zero, the likelihood of the drive failing increases. Operators could then be alerted to drives (keys) that have dropped below a threshold distance and are now likely to fail. Additional metadata could be stored within the values, such as sample time, to create a priority queue of drive replacement and calculate mean time to predicted failure based on the centroid distance calculation. According to one or more embodiments, calculating the k-means clustering is performed within a certain window (e.g., daily aggregate) or by utilizing more advanced k-means methods to reduce any computational complexity and costs of recalculating the k-means per interval, which may increase over time.

According to one or more embodiments, SMART data is collected across global data centers for a statistically significant amount of time. When an OS memory unit fails or is replaced because of performance degradation, the last collected entry in the SMART data is annotated that the drive failed for future reference. According to one or more embodiments, a foundation model is selected for fine tuning against the collected SMART data to create a tabular classification model based on the real-world SMART data. Additional supervised tuning can be applied to the fine-tuned tabular classification model using the annotated SMART data entries as examples to indicate a failing drive. The resulting model can then be utilized across a cloud for periodic queries with each OS memory unit's SMART data to predict weather a OS memory unit is likely to fail or not within the query period.

With continued reference to FIG. 3, at block 308, the failure prediction engine 150 causes the at least one of the plurality of OS memory units predicted to experience the failure to be replaced with at least one replacement OS memory unit without impacting a namespace availability of the distributed computing system. This step ensures that the predicted failing OS memory units are replaced in a manner that maintains the availability and integrity of the namespace of the distributed computing system, preventing disruptions and maintaining continuous operation.

Once an OS memory unit qualifies for replacement, the failure prediction engine 150 causes synchronizing of that OS memory unit's relevant logs and data to special vaults, such as a local vault or a management vault (depending on type of OS memory unit). The failure prediction engine 150 can generate a report that provides disk replacement information according to the namespace health, so availability of the distributed computing system is not impacted. Also, the failure prediction engine 150 can generate a report to indicate if an OS memory unit needs to be replaced. This saves the time to upgrade, as new OS memory units can be reimaged with the newer build. According to one or more embodiments, the OS memory units can be replaced in the order provided by the report to maintain availability of the distributed computing system. When an OS memory unit is replaced, and the local vault or the management vault has received that OS memory unit's relevant logs and data, then the logs/data can be transmitted to replacement OS memory unit.

Additional processes also may be included, and it should be understood that the processes depicted in FIG. 3 represent illustrations, and that other processes may be added or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Figure 4:
FIG. 4 illustrates a table of attributes for proactive OS memory unit replacement based on namespace health, according to an embodiment.

FIG. 4 illustrates a table 400 of attributes for proactive OS memory unit replacement based on namespace health, according to an embodiment. According to one or more embodiments, the attributes of the table 400 correspond to SMART attributes. The table 400 includes the following columns: ID#, which is the identifier number for each attribute; Attribute Name, which is the name of the attribute being monitored; Flag, which is the value associated with the attribute; Value, which is the current value of the attribute; Worst, which is the worst recorded value of the attribute; Threshold, which is the threshold value for the attribute, indicating a potential failure condition; Type, which is the type of attribute, such as "old age" or "pre-fail"; Updated, which is the frequency at which the attribute is updated; When_Failed Raw_Value, which indicates a time stamp of the failure of the OS memory unit.

One or more embodiments described herein significantly improves the functioning of a computer, such as a distributed computing system, by proactively managing the health and replacement of OS memory units based on namespace health. Some of the improvements are as follows.

One or more embodiments prevent system failures. By predicting the failure of OS memory units before they occur, the one or more embodiments prevents the system from entering a hang state or experiencing performance degradation. This proactive approach ensures that the system remains operational and responsive, thereby improving overall system reliability and user experience.

One or more embodiments minimizes system downtime: For example, one or more embodiments reduces the out-of-service time caused by failed OS memory units. By replacing OS memory units before they fail, the system avoids the lengthy and costly process of rebuilding data and recovering from failures. This leads to higher system availability and less disruption to users and applications.

One or more embodiments enhances data integrity. For example, one or more embodiments ensures that relevant data and logs from the failing OS memory units are backed up to local or management vaults and synchronized to new memory units. This process preserves data integrity and continuity, preventing data loss and ensuring that the system can continue to function smoothly after the replacement.

One or more embodiments provides efficient resource management. By using diagnostic data, such as SMART data and system logs, one or more embodiments accurately predicts which OS memory units are likely to fail. This targeted approach allows for efficient resource management, as only the OS memory units that are at risk of failure are replaced, rather than replacing all units indiscriminately.

One or more embodiments improves user experience: The proactive replacement of OS memory units based on predictive analysis can lead to improvements in user experience. By avoiding unexpected system failures and the associated downtime, the one or more embodiments reduces the need for emergency repairs and support. Additionally, the efficient use of resources and targeted replacements minimize unnecessary replacement of hardware not yet failing.

One or more embodiments improves system performance: By preventing performance degradation caused by failing OS memory units, one or more embodiments ensures that the system operates at optimal performance levels. This is particularly useful for distributed computing systems and data centers, where high performance and reliability are useful for handling large volumes of data and transactions.

One or more embodiments provides scalability and adaptability. For example, one or more embodiments can be applied to various types of computing environments, from individual devices to large-scale distributed systems and data centers. Its ability to collect and analyze diagnostic data from thousands of nodes in a cloud-based system makes the one or more embodiments described herein highly scalable and adaptable to different use cases and environments.

Overall, one or more embodiments improves the functioning of a computer by enhancing system reliability, minimizing downtime, preserving data integrity, efficiently managing resources, reducing costs, maintaining optimal performance, and providing scalability and adaptability for various computing environments.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:

receiving diagnostic data about a plurality of operating system (OS) memory units of a distributed computing system, the diagnostic data comprises key-value pairs of metrics;

converting, for each of the key-value pairs of metrics, a value of a key-value pair into an array of numbers, quantizing the array into a vector using k-means clustering, classifying the vector, and storing, when classified within an unhealthy cluster, a distance to a centroid of the unhealthy cluster within the value of a key-value store;

defining a failure state for predicting whether at least one of the plurality of OS memory units will experience a failure;

predicting whether the at least one of the plurality of OS memory units will experience the failure based at least in part on the failure state and the diagnostic data about the plurality of OS memory units, wherein the predicting comprises determining that the at least one of the plurality of OS memory units is likely to fail responsive to the distance to the centroid of the unhealthy cluster being below a threshold distance; and causing the at least one of the plurality of OS memory units predicted to experience the failure to be replaced with at least one replacement OS memory unit without impacting a namespace availability of the distributed computing system.

2. The computer-implemented method of claim 1, wherein receiving the diagnostic data about the plurality of OS memory units comprises collecting the diagnostic data about the plurality of OS memory units.

3. The computer-implemented method of claim 2, wherein the collecting is performed on a periodic basis.

4. The computer-implemented method of claim 1, the diagnostic data comprises self-monitoring, analysis, and reporting technology (SMART) data.

5. The computer-implemented method of claim 1, wherein causing the at least one of the plurality of OS memory units predicted to experience the failure to be replaced prevents the distributed computing system from entering a hang state.

6. The computer-implemented method of claim 1, wherein causing the at least one of the plurality of OS memory units predicted to experience the failure to be replaced prevents the distributed computing system from experiencing performance degradation.

7. The computer-implemented method of claim 1, wherein the failure state comprises a threshold, wherein the at least one of the plurality of OS memory units is predicted to experience the failure responsive to a metric about the at least one of the plurality of OS memory units exceeding the threshold.

8. The computer-implemented method of claim 1, further comprising, responsive to predicting that the at least one of the plurality of OS memory units will experience the failure, backing up data and logs stored on the at least one of the plurality of OS memory units predicted to experience the failure to at least one of a local storage vault and a management vault and synchronizing the data to the at least one replacement OS memory unit.

9. A system comprising:

a memory comprising computer readable instructions; and a processing device for executing the computer readable instructions, the computer readable instructions controlling the processing device to perform operations comprising:

receiving diagnostic data about a plurality of operating system (OS) memory units of a distributed computing system, the diagnostic data comprises key-value pairs of metrics;

converting, for each of the key-value pairs of metrics, a value of a key-value pair into an array of numbers, quantizing the array into a vector using k-means clustering, classifying the vector, and storing, when classified within an unhealthy cluster, a distance to a centroid of the unhealthy cluster within the value of a key-value store;

defining a failure state for predicting whether at least one of the plurality of OS memory units will experience a failure;

predicting whether the at least one of the plurality of OS memory units will experience the failure based at least in part on the failure state and the diagnostic data about the plurality of OS memory units, wherein the predicting comprises determining that the at least one of the plurality of OS memory units is likely to fail responsive to the distance to the centroid of the unhealthy cluster being below a threshold distance; and causing the at least one of the plurality of OS memory units predicted to experience the failure to be replaced with at least one replacement OS memory unit without impacting a namespace availability of the distributed computing system.

10. The system of claim 9, wherein receiving the diagnostic data about the plurality of OS memory units comprises collecting the diagnostic data about the plurality of OS memory units.

11. The system of claim 10, wherein the collecting is performed on a periodic basis.

12. The system of claim 9, the diagnostic data comprises self-monitoring, analysis, and reporting technology (SMART) data.

13. The system of claim 9, wherein causing the at least one of the plurality of OS memory units predicted to experience the failure to be replaced prevents the distributed computing system from entering a hang state.

14. The system of claim 9, wherein causing the at least one of the plurality of OS memory units predicted to experience the failure to be replaced prevents the distributed computing system from experiencing performance degradation.

15. The system of claim 9, wherein the failure state comprises a threshold, wherein the at least one of the plurality of OS memory units is predicted to experience the failure responsive to a metric about the at least one of the plurality of OS memory units exceeding the threshold.

16. The system of claim 9, wherein the operations further comprise, responsive to predicting that the at least one of the plurality of OS memory units will experience the failure, backing up data and logs stored on the at least one of the plurality of OS memory units predicted to experience the failure to at least one of a local storage vault and a management vault and synchronizing the data to the at least one replacement OS memory unit.

17. A computer program product comprising:

a set of one or more computer-readable storage media;

program instructions, collectively stored in the set of one or more storage media, for causing a processor set to perform the following computer operations:

receiving diagnostic data about a plurality of operating system (OS) memory units of a distributed computing system, the diagnostic data comprises key-value pairs of metrics;

converting, for each of the key-value pairs of metrics, a value of a key-value pair into an array of numbers, quantizing the array into a vector using k-means clustering, classifying the vector, and storing, when classified within an unhealthy cluster, a distance to a centroid of the unhealthy cluster within the value of a key-value store;

defining a failure state for predicting whether at least one of the plurality of OS memory units will experience a failure;

predicting whether the at least one of the plurality of OS memory units will experience the failure based at least in part on the failure state and the diagnostic data about the plurality of OS memory units, wherein the predicting comprises determining that the at least one of the plurality of OS memory units is likely to fail responsive to the distance to the centroid of the unhealthy cluster being below a threshold distance; and causing the at least one of the plurality of OS memory units predicted to experience the failure to be replaced with at least one replacement OS memory unit without impacting a namespace availability of the distributed computing system.

18. The computer program product of claim 17, wherein receiving the diagnostic data about the plurality of OS memory units comprises collecting the diagnostic data about the plurality of OS memory units.

19. The computer program product of claim 18, wherein the collecting is performed on a periodic basis.

20. The computer program product of claim 17, the diagnostic data comprises self-monitoring, analysis, and reporting technology (SMART) data.

* * * * *